(12) United States Patent
Kim

(10) Patent No.: US 9,489,130 B2
(45) Date of Patent: Nov. 8, 2016

(54) MOBILE TERMINAL SELECTIVELY ACTING ONLY PART OF A DISPLAY AND CONTROL METHOD THEREOF

(71) Applicant: LG Electronics Inc., Seoul (KR)

(72) Inventor: Jieun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/675,123

(22) Filed: Mar. 31, 2015

(65) Prior Publication Data

US 2015/0277756 A1    Oct. 1, 2015

(30) Foreign Application Priority Data

Apr. 1, 2014 (KR) .................. 10-2014-0038766

(51) Int. Cl.
*G06F 3/0488* (2013.01)
*H04M 1/725* (2006.01)
*G06F 3/0484* (2013.01)
*G06F 1/32* (2006.01)

(52) U.S. Cl.
CPC ......... *G06F 3/04886* (2013.01); *G06F 1/3265* (2013.01); *G06F 3/04842* (2013.01); *G06F 3/04883* (2013.01); *H04M 1/72522* (2013.01); *H04M 1/72583* (2013.01); *G06F 2203/04808* (2013.01)

(58) Field of Classification Search
CPC ....................................................... G06F 3/017
USPC ........................................................... 455/566
See application file for complete search history.

(56) References Cited

U.S. PATENT DOCUMENTS

| | | | |
|---|---|---|---|
| 2010/0001967 A1* | 1/2010 | Yoo ........ | G06F 3/0488 345/173 |
| 2010/0171753 A1 | 7/2010 | Kwon | |
| 2013/0145316 A1* | 6/2013 | Heo .......... | G06F 3/04817 715/810 |
| 2013/0222323 A1 | 8/2013 | McKenzie | |
| 2013/0227495 A1 | 8/2013 | Rydenhag et al. | |
| 2014/0347302 A1* | 11/2014 | Li ............. | G06F 3/041 345/173 |

* cited by examiner

*Primary Examiner* — Marisol Figueroa
(74) *Attorney, Agent, or Firm* — Birch, Stewart, Kolasch & Birch, LLP

(57) ABSTRACT

A mobile terminal including a wireless communication unit configured to provide wireless communication; a display; and a controller configured to control the display to be in at least one of a first state in which the entire display is deactivated, a second state in which the entire display is activated and a third state in which a partial region of the display is activated, receive a plurality of touches applied to the display in the partial region, and display a window including at least one of an icon indicating a newly generated event, an icon frequently used by a user and an icon corresponding to a predetermined function, in the activated partial region.

18 Claims, 31 Drawing Sheets

(a)

(b)

(c)

(a)

(b)

(a)

(b)

(a)

(b)

(a)

(b)

(a)

(b)

(c)

(a)

(b)      (c)      (d)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL SELECTIVELY ACTING ONLY PART OF A DISPLAY AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0038766, filed on Apr. 1, 2014, the contents of which are incorporated by reference herein in their entirety.

DISCUSSION OF THE BACKGROUND

1. Field of the Invention

The present invention relates to a mobile terminal for effectively displaying necessary information by selectively activating only part of a display and a control method thereof.

2. Discussion of the Related Art

As functions of terminals such as personal computers, laptop computers, cellular phones diversify, the terminals become multimedia players having multiple functions for capturing pictures or moving images, playing music, moving image files and games and receiving broadcasting programs. Terminals can be categorized as mobile terminals and stationary terminals. The mobile terminals can be further comprised of handheld terminals and vehicle mount terminals. Related art terminals including mobile terminals provide an increasing number of complex and various functions.

However, the display of information on the mobile terminal is still limited in nature and often inconvenient to the user.

SUMMARY OF THE INVENTION

Accordingly, one object of the present invention is to provide a mobile terminal for effectively displaying necessary information by selectively activating only part of a display and a control method thereof.

To achieve these and other advantages and in accordance with the purpose of the present invention, as embodied and broadly described herein, the present invention provides in one aspect a mobile terminal including a wireless communication unit configured to provide wireless communication; a display; and a controller configured to control the display to be in at least one of a first state in which the entire display is deactivated, a second state in which the entire display is activated and a third state in which a partial region of the display is activated, receive a plurality of touches applied to the display in the partial region, and display a window including at least one of an icon indicating a newly generated event, an icon frequently used by a user and an icon corresponding to a predetermined function, in the activated partial region. The present invention also provides a corresponding method of controlling the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF EMBODIMENTS OF THE INVENTION

Arrangements and embodiments may now be described more fully with reference to the accompanying drawings, in which embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other. The mobile terminal may include a cellular phone, a smart phone, a laptop computer, a digital broadcasting terminal, personal digital assistants (PDA), a portable multimedia player (PMP), a navigation system and/or so on.

Figure 1A:
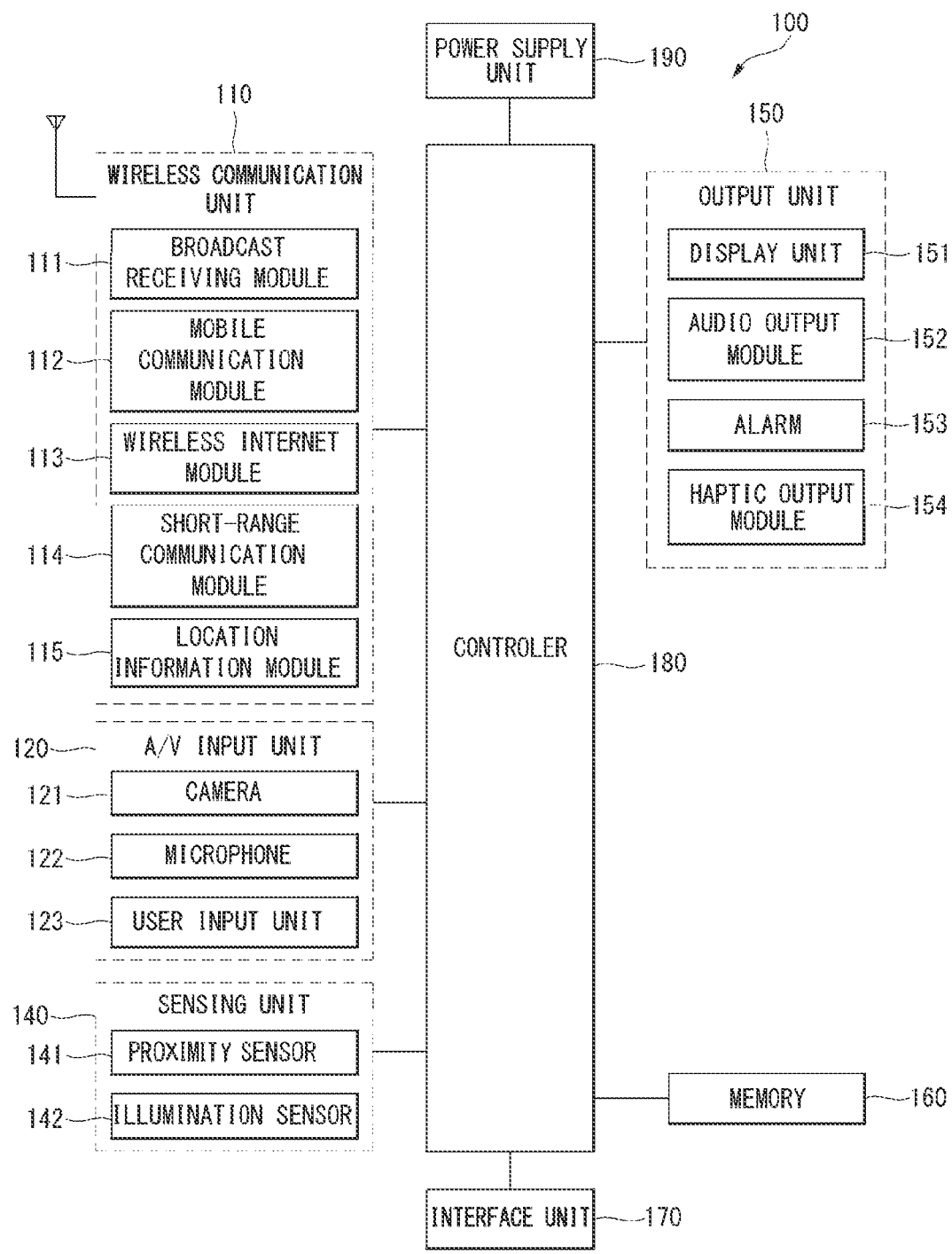
FIG. 1A is a block diagram of a mobile terminal according to an embodiment.

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (A/V) input unit 120, a user input unit 130, a sensing unit 140, an output unit 150, a memory 160, an interface unit 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 can receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 can receive broadcasting signals using various broadcasting systems. More particularly, the broadcasting receiving module 111 can receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 can receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 can correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 can confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 can input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 can receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 can sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in a slide phone, the sensing unit 140 can sense whether the slide phone is opened or closed. Further, the sensing unit 140 can sense whether the power supply 190 supplies power and/or whether the interface unit 170 is connected to an external device. The sensing unit 140 may also include a proximity sensor 141. The sensing unit 140 may sense a motion of the mobile terminal 100.

The output unit 150 can generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor can convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 can sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen. An illumination sensor 142 can also be provided.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 can output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 can generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 can generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154. An optical output module can also be provided.

The memory 160 can store a program for operations of the controller 180 and/or temporarily store input/output data such as a phone book, messages, still images, and/or moving images. The memory 160 can also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface unit 170 may serve as a path to external devices connected to the mobile terminal 100. The interface unit 170 can receive data from the external devices or power and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 1B:
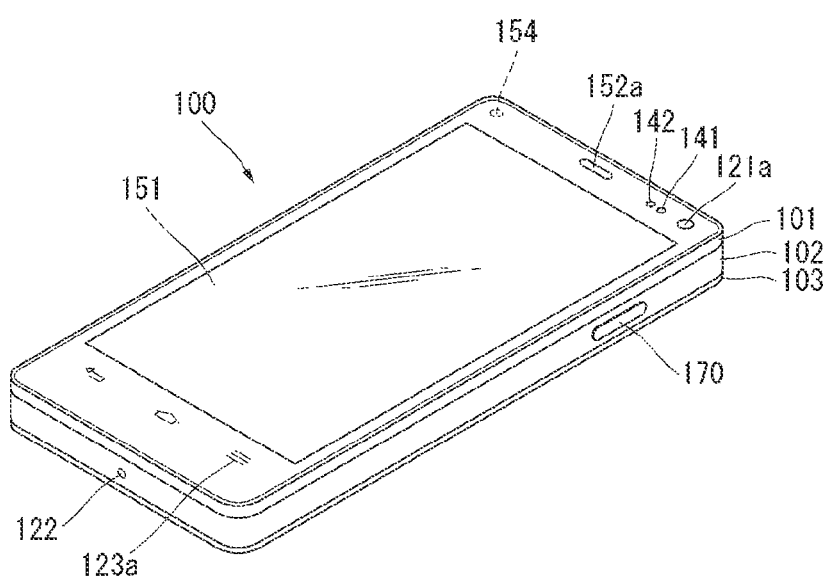
FIG. 1B is a front perspective view of the mobile terminal according to an embodiment.

FIG. 1B is a front perspective view of a mobile terminal (or a handheld terminal) according to an embodiment. The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti). The display 151, the audio output unit 152, the camera 121, the user input unit 123a, 123b, the microphone 122 and the interface unit 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 123, and the microphone 122 may be located in a region in proximity to another end of the display 151. The user input unit 123 and the interface unit 170 may be arranged (or provided) on sides of the front case 101 and the rear case 102.

The user input unit 123 may receive commands for controlling operation of the mobile terminal 100, and may include a plurality of operating units 123a and 123b. The operating units may be referred to as manipulating portions and may employ any tactile manner in which a user operates the operating units while having tactile feeling.

The first and second operating units 123a and 123b may receive various inputs. For example, the first operating unit may receive commands such as start, end and scroll and the second operating unit may receive commands such as control of a volume of sound output from the audio output unit 152a or conversion of the display 151 to a touch recognition mode.

Figure 1C:
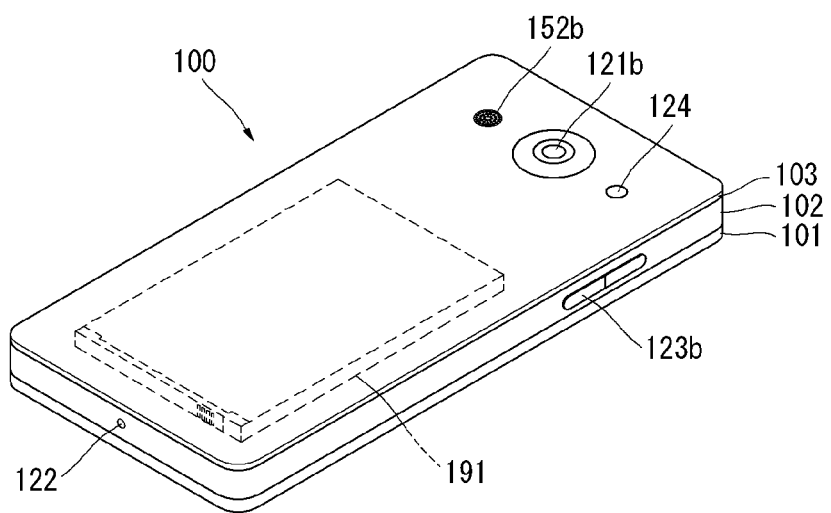
FIG. 1C is a rear perspective view of the mobile terminal according to an embodiment.

FIG. 1C is a rear perspective view of the mobile terminal according to an embodiment. Referring to FIG. 1C, a camera 121b may be additionally attached to the rear side of the terminal body (i.e., the rear case 102). The camera 121b may have a photographing direction opposite to that of the camera 121a and may have pixels different from those of the camera 121a.

For example, it may be desirable that the camera 121a has low pixels such that the camera 121a may capture an image of a face of a user and transmit the image to a receiving part when video telephony while the camera 121b has high pixels because the camera 121b captures an image of a general object and does not immediately transmit the image in many cases. The cameras 121a and 121b may be attached (or provided) to the terminal body such that the cameras 121a and 121b may rotate or pop-up.

A flash bulb and a mirror 124 may be additionally provided in proximity to the camera 121b. The flash bulb may light an object when the camera 121b takes a picture of the object. The mirror 124 may be used for the user to look at his/her face in the mirror when the user wants to self-photograph himself/herself using the camera 121b.

An audio output unit 152b may be additionally provided on the rear side of the terminal body. The audio output unit 152b may achieve a stereo function with the audio output unit 152a (shown in FIG. 1B) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad for sensing touch may be attached to the rear case 102. The touch pad may be of a light transmission type, such as the display 151. In this example, if the display 151 outputs visual information through both sides thereof, the visual information may be recognized (or determined) by the touch pad. The information output through both sides of the display 151 may be controlled by the touch pad. Otherwise, a display may be additionally attached (or provided) to the touch pad such that a touch screen may be arranged (or provided) even in the rear case 102.

The touch pad may operate in connection with the display 151 of the front case 101. The touch pad may be located in parallel with the display 151 behind the display 151. The touch panel 135 may be identical to or smaller than the display 151 in size. The proximity sensor 141 and illumination sensor 142 are also shown in FIG. 1B.

Figure 2:
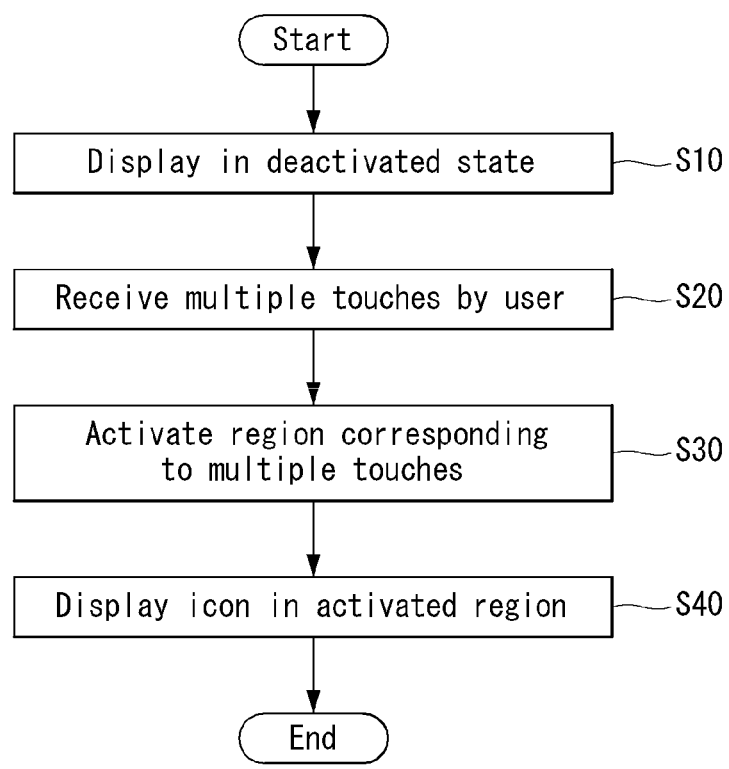
FIG. 2 is a flowchart illustrating operation of the mobile terminal according to an embodiment of the present invention.

FIG. 2 is a flowchart illustrating operation of the mobile terminal according to an embodiment of the present invention. As shown, the controller 180 of the mobile terminal according to an embodiment of the present invention can perform a step S10 of deactivating the display 151.

A deactivated state may refer to a state in which the display 151 is turned off or dimmed. For example, the deactivated state can refer to a state in which power supply to the display 151 is cut or a backlight is completely or partially turned off. However, the deactivated state of the display 151 may not be a state in which the mobile terminal 100 is turned off.

The deactivated state may be a first state in which the entire display 151 is deactivated. That is, the deactivated state may refer to a state in which the entire display 151 is turned off or dimmed. The first state in which the entire display 151 is deactivated may differ from a second state in which the entire display 151 is activated and/or a third state in which part of the display 151 is activated. In the following description, "deactivated state" refers to a state in which the entire display 151 is deactivated unless otherwise mentioned and is referred to as "first state."

The deactivated state may be a state according to active operation and/or passive operation of a user and/or the controller 180. For example, the user can turn off the display 151 or the backlight of the display 151 by operating the mobile terminal 100. When the user does not operate the mobile terminal 100 for a predetermined time or longer, the controller 180 can turn off or dim the display 151. That is, the deactivated state refers to a state in which only the display 151 is deactivated since user operation is not applied for a predetermined time or longer or for other reasons although the mobile terminal 100 is in a standby state.

Subsequently, a step S20 in which a plurality of touches is applied by the user is performed. A touch operation may be touch applied to the display 151. For example, the touch operation may be a motion of tapping on at least a point of the display 151 with a finger. Through such operation, the user can wake the sleeping mobile terminal 100.

The mobile terminal 100 may be in a standby state even if the display 151 is turned off or dimmed, as described above. That is, the mobile terminal 100 can obtain touch operation of the user through the sensing unit 140 irrespective of ON/OFF/dim states of the display 151.

The sensing unit 140 may be a touch sensor capable of sensing approach and/or touch of a user's finger or the like, a vibration sensor capable of sensing vibration according to user touch applied to the mobile terminal 100 and/or an acceleration sensor capable of sensing fine movement of the body of the mobile terminal 100 according to user touch.

Touch operation may be touch applied to a plurality of points on the display 151. The controller 180 can determine whether user touch applied to the plurality of points corresponds to a predetermined touch pattern, which will be described in detail later. The controller 180 can activate the mobile terminal 100 in the standby state when the user touch corresponds to the predetermined touch pattern. That is, the user can unlock the mobile terminal by lightly touching the display 151 while the display 151 is turned off or dimmed. Accordingly, the user can use the mobile terminal 100 more conveniently and wake the mobile terminal 100.

Subsequently, a step S30 of activating a region of the display, which corresponds to the plurality of touches from the user, is performed. The controller 180 can calculate a predetermined region of the display based on at least one of relative and/or absolute positions to which the touches are applied, distance of the relative and/or absolute positions and time when the touches are applied. For example, when four points are touched, the controller 180 can produce a rectangular region obtained by connecting the four points.

When the region is produced, the controller 180 can activate the region. For example, the controller 180 can selectively activate only the region corresponding to the plurality of touches while maintaining the remaining region of the display 151 in the deactivated state. In the following description, a state in which only part of the display 151 is activated is referred to as "a third state" unless otherwise mentioned. The third state in which only part of the display 151 is selectively activated differs from the first state in which the entire display 151 is deactivated and the second state in which the entire display 151 is activated. This can be easily understood considering that the overall area of the display 151 is normally turned off, turned on and dimmed. The mobile terminal 100 according to an embodiment of the present invention differs from conventional mobile terminals in that the former can selectively activate only a region of the display 151 in response to a specific touch operation of the user.

When only a region of the display 151 is selectively activated, the following effects can be expected. For example, power consumption can be reduced, compared to when the entire display 151 is activated, by activating only a minimum region and displaying necessary information to the user through the activated region. Further, only a minimum region of the display 151 can be turned on in a dark environment such as inside of a theater so as to minimize the influence on the surrounding area.

A step S40 of displaying icons in the activated region of the display 151 can be performed. Information necessary for the user may be displayed in the activated region. That is, information that can be recognized without entering the second state in which the entire display 151 is activated can be displayed. The user can change the state of the mobile terminal to the second state in which the entire display 151 is activated or the first state in which the entire display 151 is deactivated as necessary after recognizing the necessary information in the third state in which only the region is activated.

The information necessary for the user may be displayed in the form of an icon. For example, the information can be displayed in the form of at least one of an icon indicating a newly generated event, an icon corresponding to a specific function that is frequently used by the user and an icon corresponding to a predetermined function. At least one icon can be displayed in the region corresponding to the touches of the user, as described above.

Figure 3:
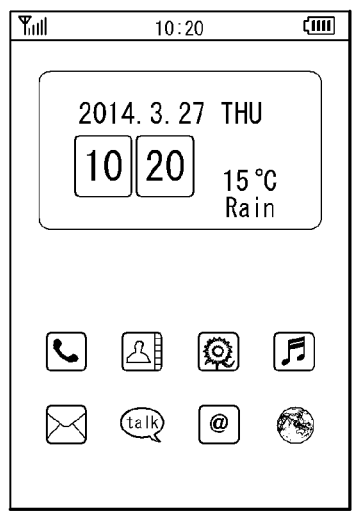
FIG. 3 shows first and second states of a display of the mobile terminal of FIG. 2.
Figure 3:
Figure 3:
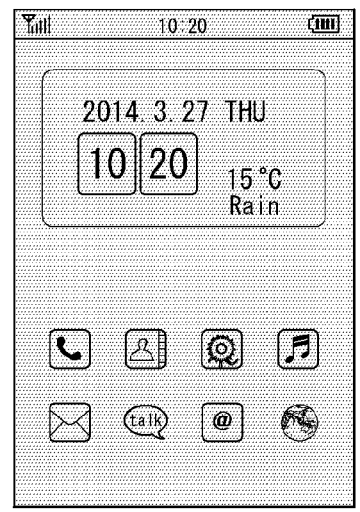

FIG. 3 illustrates the first and second states of the display of the mobile terminal of FIG. 2. As shown, the mobile terminal 100 according to an embodiment of the present invention may be in the first state or the second state. As shown in FIG. 3(a), the mobile terminal 100 may be in the second state in which the entire display 151 is activated. That is, objects including icons can be displayed on the overall area of the display 151. In the second state, the user can normally use the mobile terminal 100 through manipulation of the display 151.

As shown in FIGS. 3(b) and 3(c), the mobile terminal 100 may be in the first state in which the entire display 151 is deactivated. The first state may be when the entire display 151 is turned off and/or the entire display 151 is dimmed. This case can occur when the mobile terminal 100 enters the standby state since the user does not operate the mobile terminal 100 for a predetermined time or longer.

Figure 4:
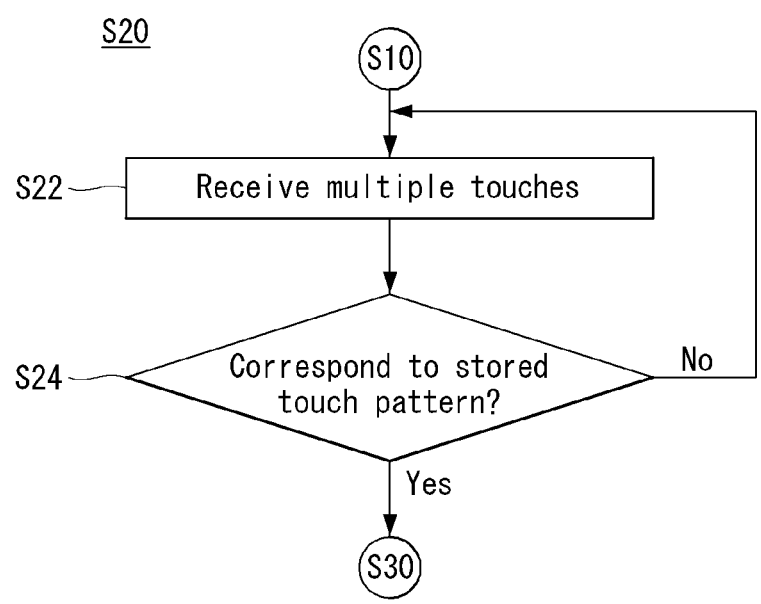
FIG. 4 is a flowchart illustrating a process of applying touches, shown in FIG. 2.
Figure 5:
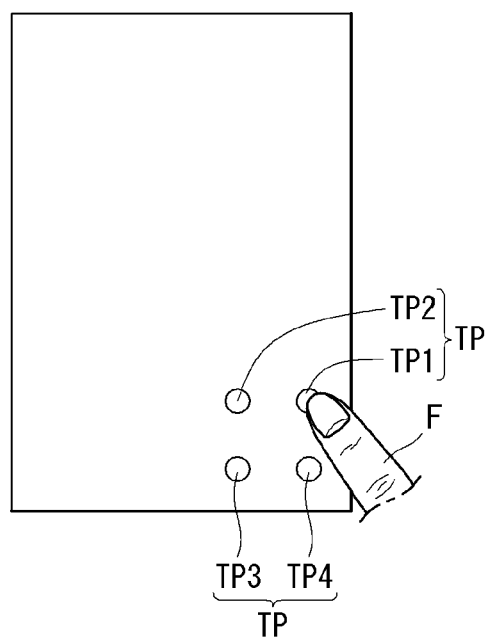
FIGS. 5 to 8 illustrate a process of activating a region of the display according to a touch pattern.
Figure 5:
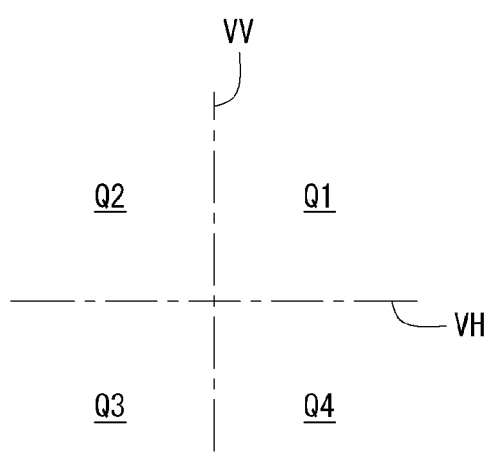
Figure 6:
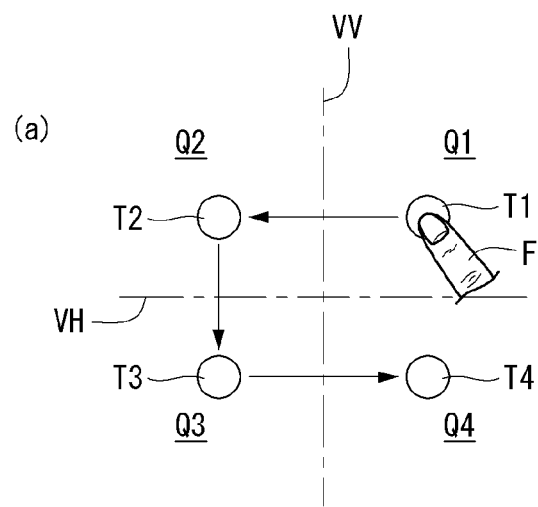
Figure 6:
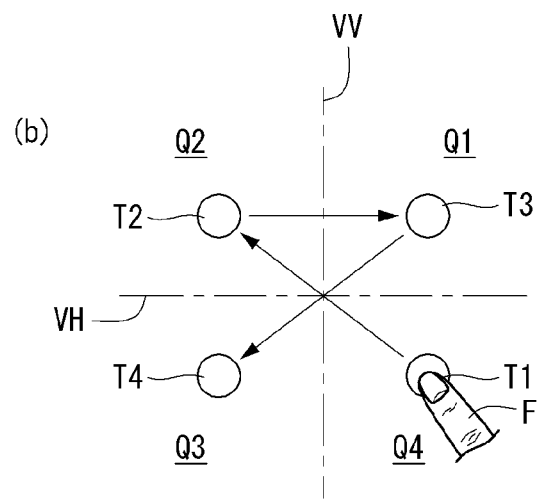

FIG. 4 is a flowchart illustrating a process of applying touches, shown in FIG. 2, in detail. As shown, the step (S20 of FIG. 2) in which the user applies a plurality of touches may include a step S22 in which a plurality of touches is applied.

A touch operation may be performed while the display 151 is in the first state. For example, the display 151 can be directly touched while the display 151 is turned off. The touch operation may be a plurality of touches. For example, touch operation can correspond to discontinuous touches applied to spaced points.

Subsequently, a step S24 of determining whether the touches correspond to a stored touch pattern is performed. The plurality of touches may function as a password. For example, the controller 180 can convert the state of the mobile terminal 100 into the third state when an input touch pattern corresponds to a touch pattern predetermined by the user of the mobile terminal 100.

Since the mobile terminal 100 can directly enter the third state in which only a touched region of the display is selectively activated through touch operation corresponding to the predetermined touch pattern, convenience of using the mobile terminal can be improved compared to a conventional case in which necessary follow-up operations need to be performed after unlocking the mobile terminal 100.

FIGS. 5 to 8 illustrate a process of activating a region of the display according to a touch pattern. As shown, the controller 180 of the mobile terminal 100 according to an embodiment of the present invention can control the mobile terminal 100 to enter the third state according to touch applied by the user. As shown in FIG. 5(a), the user can apply a plurality of touches to a region of the deactivated display 151. For example, the user can apply first to fourth touches TP1 to TP4 using a finger F.

The first to fourth touches TP1 to TP4 may be a series of touches applied within a predetermined time. For example, the second, third and fourth touches TP2, TP3 and TP4 are applied within a predetermined time after the first touch TP1 is applied. When no touch is applied for the predetermined time or longer upon input of the first touch TP1, the controller 180 can ignore input of the first touch TP1.

The first to fourth touches TP1 to TP4 may be applied to spaced points. The controller 180 can calculate the area formed by the points to which the first to fourth touches TP1 to TP4 are applied and activate a region corresponding to the area.

As shown in FIG. 5(b), the controller 180 can set a virtual horizontal line VH and a virtual vertical line VV. First to fourth regions Q1 to Q4 can be defined according to the virtual horizontal line VH and the virtual vertical line VV. The controller 180 can set the virtual horizontal line VH and/or the virtual vertical line VV based on the first touch of the user.

As shown in FIG. 6(a), the user can apply the first touch TP1. Upon application of the first touch TP1, the controller 180 can set the virtual horizontal line VH and/or the virtual vertical line VV based on the first touch TP1. When the virtual horizontal line VH and/or the virtual vertical line VV are set, the first to fourth regions Q1 to Q4 can be defined.

The controller 180 can sense the first to fourth touches TP1 to TP4 of the user. For example, the controller 180 can sense the second touch TP2 applied to a point spaced apart from a point, to which the first touch TP1 is applied, to the left after the first touch TP1, the third touch TP3 applied to a point spaced apart from the point, to which the second touch TP2 is applied, downward after the second touch TP2, and the fourth touch TP4 applied to a point spaced apart from the point, to which the third touch TP3 is applied, to the right after the third touch TP3.

The controller 180 can determine whether the positions and/or order of the first to fourth touches TP1 to TP4 correspond to a prestored pattern. For example, the controller 180 can determine whether the positions and/or order of the first to fourth touches TP1 to TP4 applied in the first state correspond to prestored positions and/or order. The controller 180 can cancel the first state when touch TP applied by the user corresponds to a prestored pattern.

As shown in FIG. 6(b), the user may apply the first to fourth touches TP1 to TP4 in different patterns. For example, the user can perform touch operation TP that starts from the fourth region Q4, passes through the second region Q2 and the first region Q1 and ends in the third region Q3.

The controller 180 can determine whether the touch operation TP corresponds to a prestored pattern. Further, the controller 180 can calculate a region determined by the touch operation TP. For example, the controller 180 can calculate a region based on a polygon having the points to which the first to fourth touches TP1 to TP4 are applied as vertices. Since the controller 180 can cancel the deactivated state and, simultaneously, calculate a region in which information will be displayed based on whether the touch operation TP corresponds to the prestored pattern, convenience can be improved.

Figure 7:
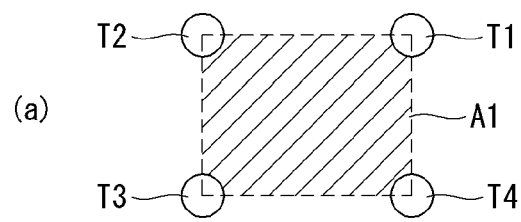
Figure 7:
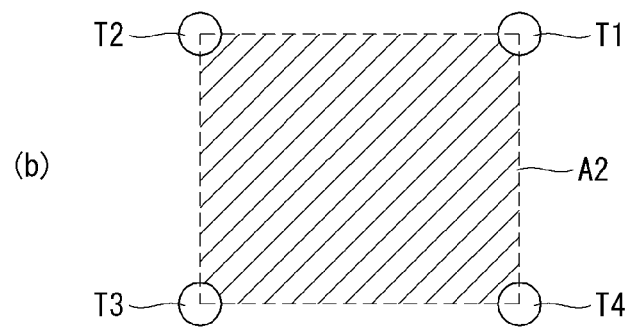

Referring to FIG. 7, a specific region can be determined by touch operation TP. The specific region may depend on the touch operation TP of the user. For example, a first area A1 determined by first to fourth touches TP1 to TP4 as shown in FIG. 7(*a*) may have a width and/or a position different from the width and/or position of a second area A2 determined by first to fourth touches TP1 to TP4 as shown in FIG. 7(*b*).

Figure 8:
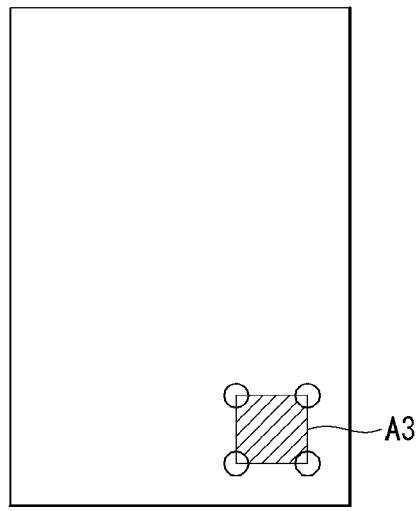
Figure 8:
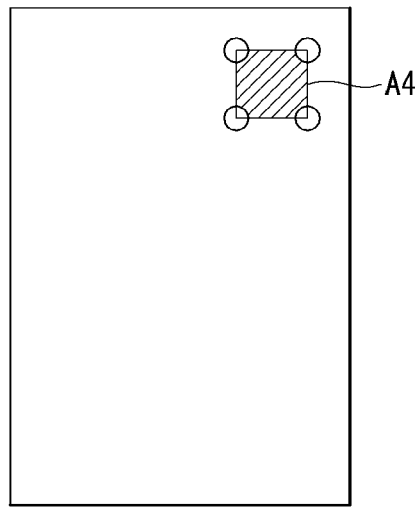

Referring to FIG. 8, the width and/or position of a window displayed in a region determined by a polygon having the points, to which the first to fourth touches TP1 to TP4 are applied, as vertices may depend on the width and/or position of the region. For example, a third area A3 can be located in the lower part of the right side of the display 151, as shown in FIG. 8(*a*), and a fourth area A4 can be located in the upper part of the right side of the display 151, as shown in FIG. 8(*b*). That is, a region can be set at a position to which touch from the user is applied.

FIGS. 9 to 16 illustrate a window displayed in an activated region of the display. As shown, the controller 180 of the mobile terminal 100 according to an embodiment of the present invention can display a window EA for displaying information at a position corresponding to touch applied by the user. The window EA may be displayed as a relatively small screen. The window EA can display information necessary for the user. Since the window EA can display information in the third state in which only a small region is selectively activated, the user can obtain necessary information while minimizing the influence of the display 151 when the display 151 is turned on.

Figure 9:
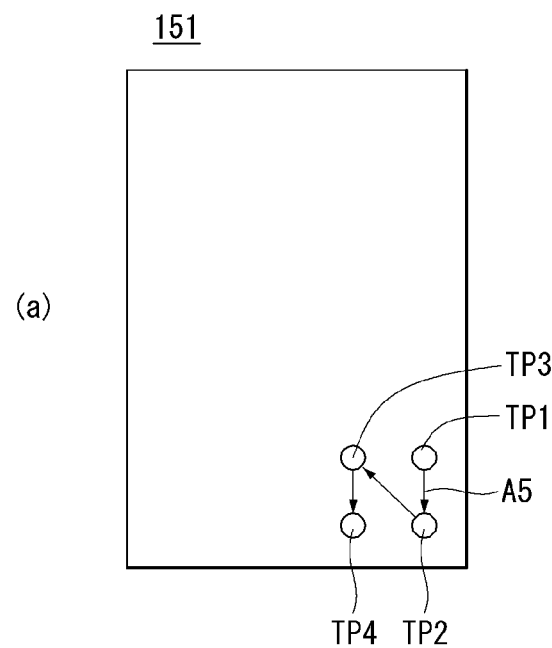
FIGS. 9 to 16 illustrate a window displayed in the activated region.
Figure 9:
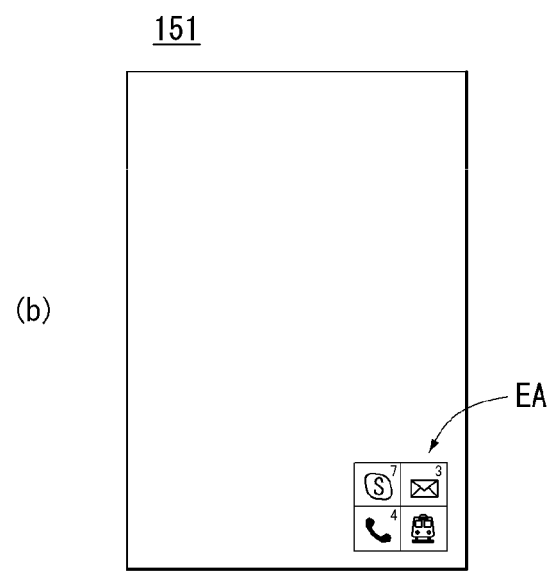

As shown in FIG. 9(*a*), the user can apply first to fourth touches T1 to T4 to a region of the display 151. A fifth area A5 can be set in response to the touches of the user. As shown in FIG. 9(*b*), the controller 180 can selectively activate only a region corresponding to the fifth area A5 according to the touch operation of the user.

The controller 180 can display the window EA in the activated region corresponding to the fifth area A5. The controller 180 can display information necessary for the user in the window EA. The controller 180 can display the information in the form of icons in the window EA. The controller 180 can further display information related to an icon selected by the user upon selection of the icon by the user. The controller 180 can further selectively activate a region of the display, which is necessary to display the related information.

Figure 10:
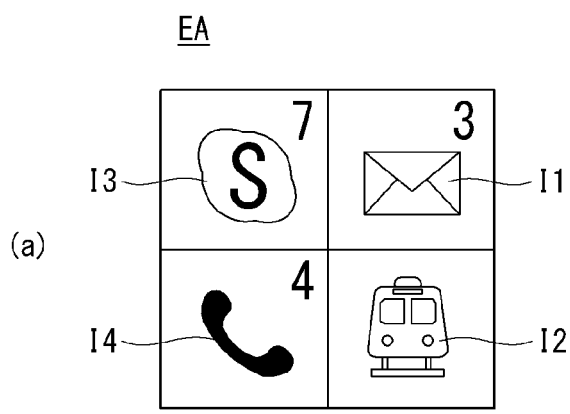
Figure 10:
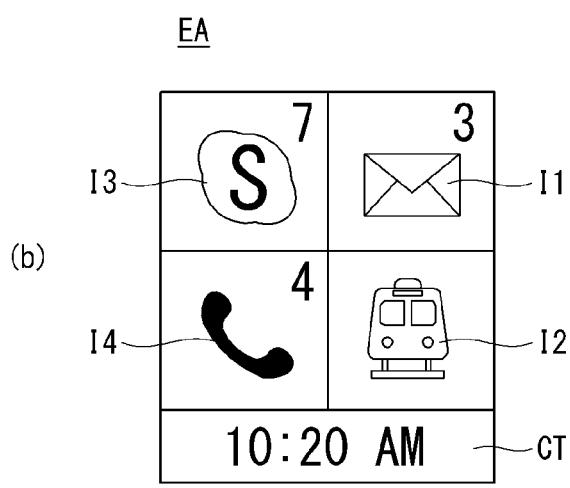

As shown in FIG. 10(*a*), the controller 180 of the mobile terminal 100 according to an embodiment of the present invention can display the window EA. The window EA may include a plurality of icons I1 to I4. The plurality of icons I1 to I4 can correspond to specific information. Positions of the icons I1 to I4 may be determined by the user and/or the controller 180. The positions of the icons I1 to I4 may be determined by touch operation of the user. At least one of the icons I1 to I4 may be fixed to a specific position.

The icons I1 to I4 may be various icons. However, the following description exemplifies icons for indicating newly generated events, such as message reception, as the first and third icons I1 and I3, exemplifies an icon corresponding to a function frequently used by the user as the second icon I2 and exemplifies an icon corresponding to a call function as the fourth icon I4 for convenience.

Figure 11:
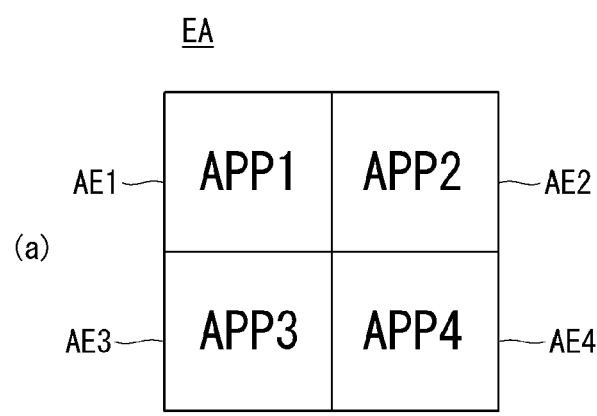
Figure 11:
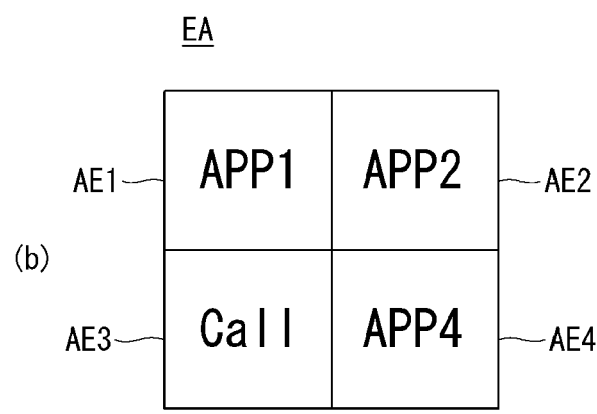
Figure 12:
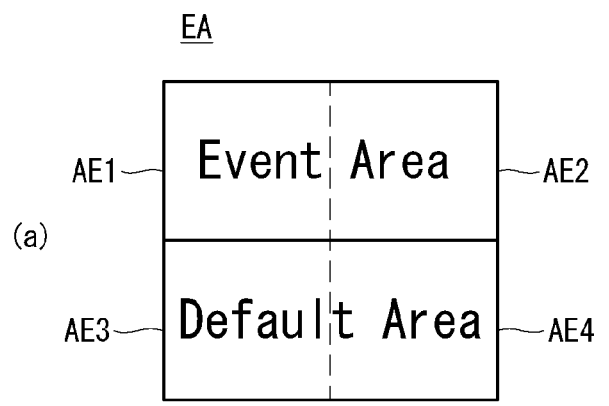
Figure 12:
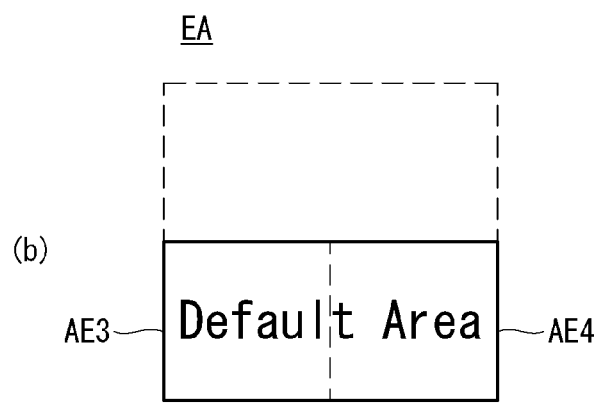
Figure 12:
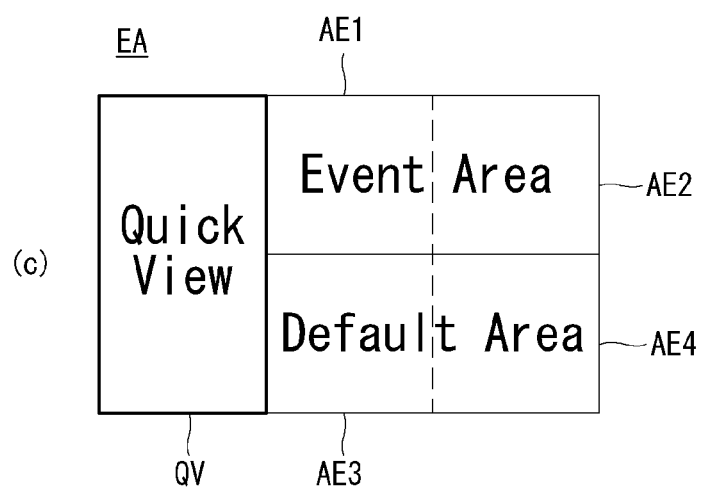

As shown in FIG. 10(*b*), the window EA may further include a time indicator CT. For example, the time indicator CT indicating the current time may be provided to an area adjacent to the window EA. As shown in FIGS. 11 and 12, information can be displayed through the window EA in various manners. Referring to FIG. 11(*a*), the window EA can be divided into first to fourth areas AE1 to AE4. The first to fourth areas AE1 to AE4 may have a form corresponding to a set of rectangular tiles respectively corresponding to the first to fourth areas.

The first to fourth areas AE1 to AE4 may be respectively related to specific applications. For example, icons through which the specific applications can be executed can be arranged in the first to fourth areas AE1 to AE4.

Referring to FIG. 11(*b*), one of the first to fourth areas AE1 to AE4 may correspond to a call function. For example, an icon corresponding to the call function can be disposed in the third area AE3. The call function may be one of fundamental functions of the mobile terminal 100 and may be a function most frequently used by the user. Accordingly, the icon corresponding to the call function frequently used by the user can be arranged at a position at which the user can use the icon conveniently.

Referring to FIG. 12(*a*), the window EA may be divided into an event area and a default area. For example, the first and second areas AE1 and AE2 corresponding to the upper part of the window EA can be used as the event area and the third and fourth areas AE3 and AE4 corresponding to the lower part of the window EA can be used as the default area.

The event area may be an area in which a newly generated and/or input event is displayed. For example, reception of a new message, reception of new e-mail and the like can be displayed in the event area. The default area may be an area in which icons corresponding to a function frequently used by the user and/or a predetermined function are displayed. For example, the call function and a function allocated by the user can be displayed in the default area.

Referring to FIG. 12(*b*), the controller 180 can display only the default area. For example, the controller 180 can display only the third and fourth areas AE3 and AE4 corresponding to the default area when a new event is not generated although the window EA needs to be displayed.

Referring to FIG. 12(*c*), the controller 180 can display a quick view area QV. Information in which the user may be interested can be briefly displayed in the quick view area QV. For example, when an alarm sounds, a screen through which the alarm is turned off or a set time is changed can be displayed in the quick view area QV. When a message is received, at least part of the received message can be displayed in the quick view area QV.

Figure 13:
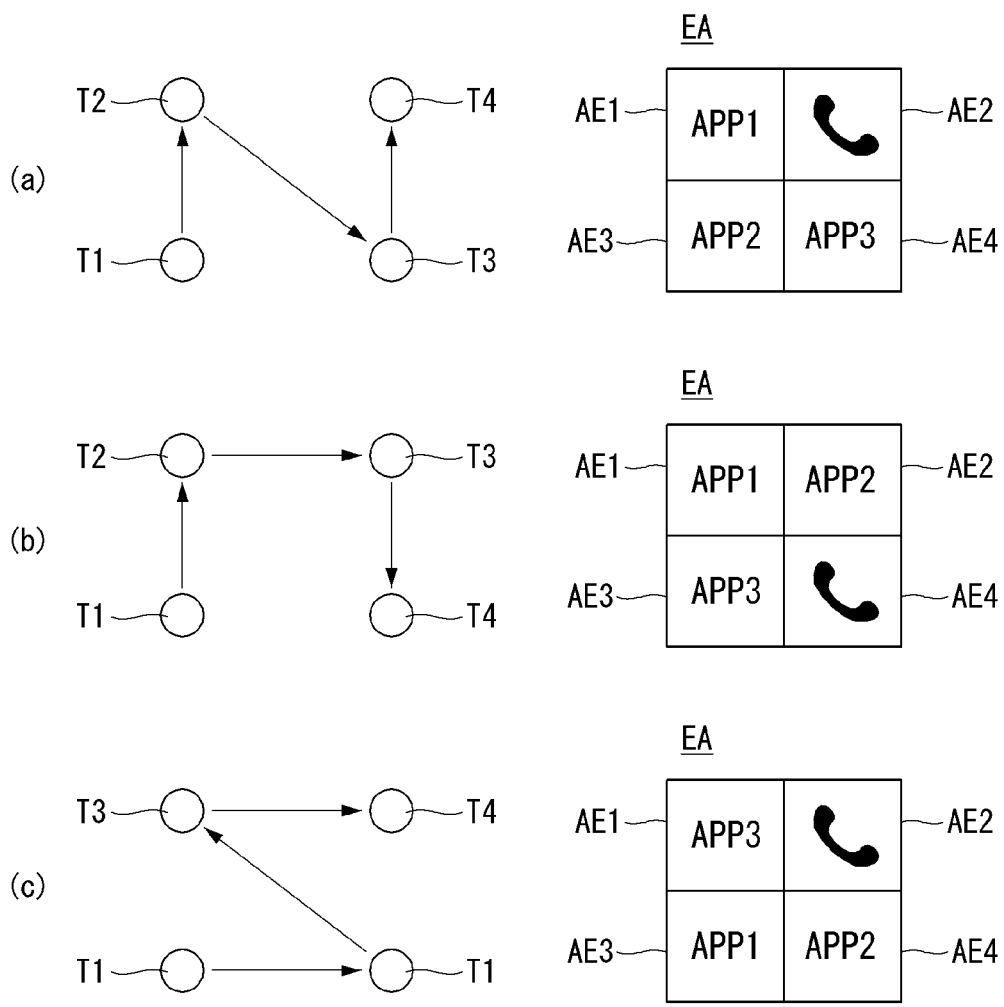
Figure 14:
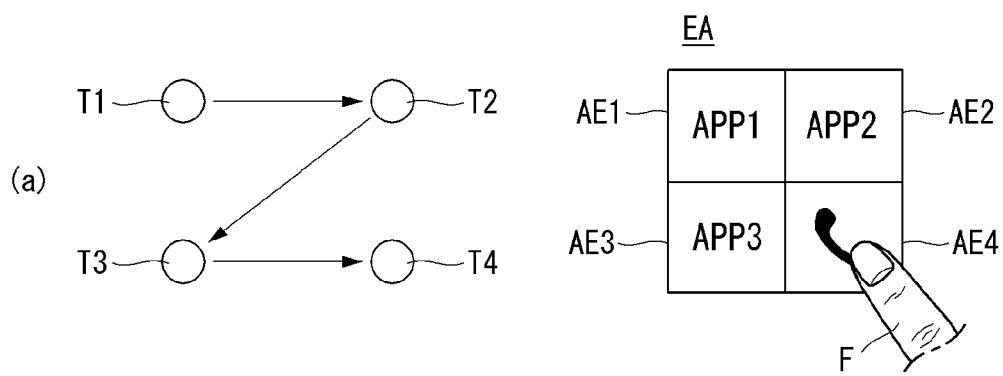
Figure 14:
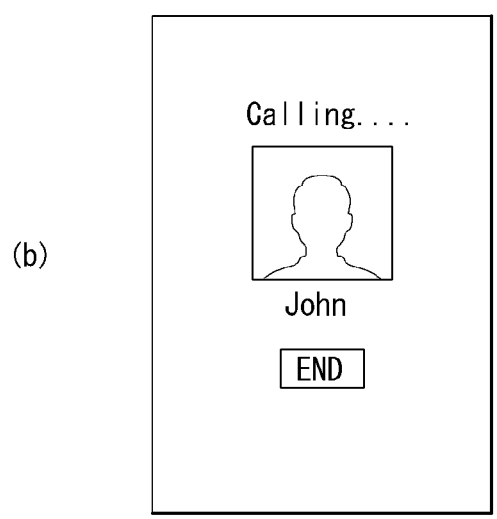

As shown in FIGS. 13 and 14, the controller 180 of the mobile terminal 100 according to an embodiment of the present invention may arrange icons in the window EA in response to a touch pattern of the user.

Referring to FIG. 13(*a*), the user can sequentially apply second, third and fourth touches T2, T3 and T4 after the first touch T1. The controller 180 can display an icon corresponding to the call function in the fourth area AE4 corresponding to the fourth touch T4, which is the last touch. When the icon corresponding to the call function, most frequently used by the user, is arranged in the region to which the user applies the last touch, the user can use the call function while minimizing additional operation. That is, the user can immediately make a call while minimizing movement of the finger used to apply the last touch.

The controller 180 can arrange first, second and third applications APP1, APP2 and APP3 in predetermined order irrespective of touch operation of the user. For example, the controller 180 can arrange the first application APP1 in the first area AE1, arrange the second application APP2 in the third area AE3 since the call function is assigned to the second area AE2 and arrange the fourth application APP4 in the fourth area AE4. The user may apply the first to fourth touches T1 to T4, as shown in FIG. 13(*b*). The controller 180 can assign the call function to the fourth area AE4 to which the fourth touch T4 is applied.

Referring to FIG. 13(*c*), the controller 180 can arrange icons in order of touches. For example, when the first to fourth touches T1 to T4 are applied in predetermined order, the controller 180 can sequentially arrange the icons in the third area AE3, the fourth area AE4 and the second area AE2 corresponding to the touch order and/or touched positions. That is, the first application APP1 can be assigned to the third area AE3, the second application APP2 can be assigned to the fourth area AE4, the third application APP3 can be assigned to the first area AE1 and the call application can be assigned to the second area AE2. Since functions can be arranged in response to touch of the user, arrangement of the functions can be optimized for characteristics of the user.

Referring to FIG. 14(*a*), the call function may be assigned to the fourth area AE4 corresponding to the fourth touch T4 that is the last touch from among touches applied by the user. When the call function is assigned to the fourth area AE4 to which the last touch is applied, the user can easily select the frequently used call function while minimizing movement of a finger F. That is, when the fourth touch T4 is applied, the call function is assigned to the fourth area AE4 and thus the user can rapidly execute the call function, as shown in FIG. 14(*b*), while minimizing movement of the finger F.

Figure 15:
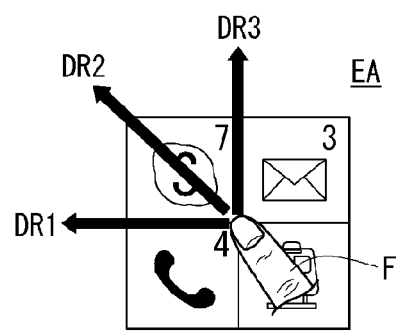
Figure 15:
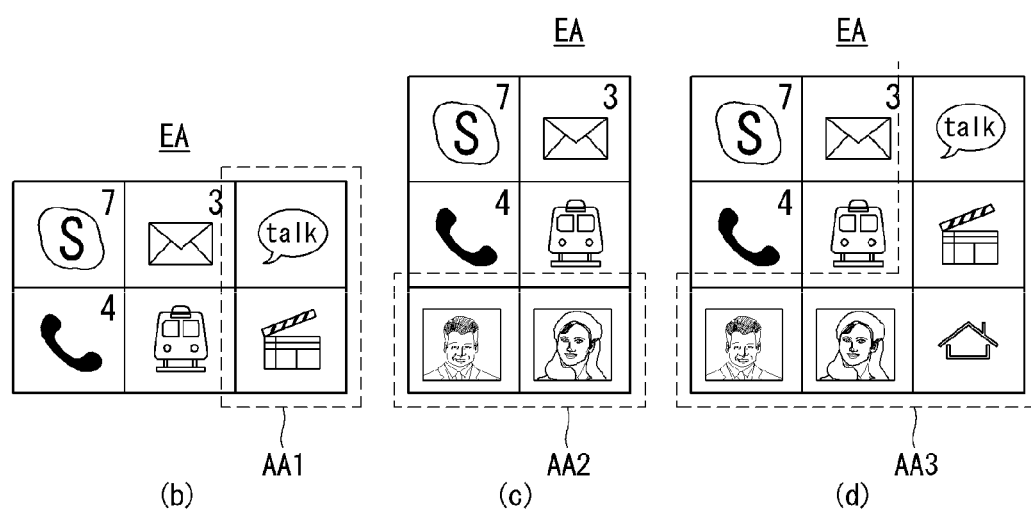
Figure 16:
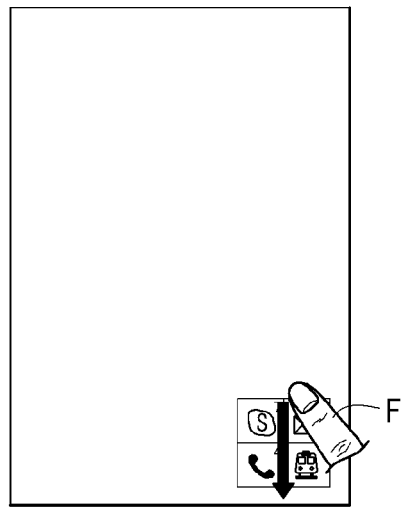
Figure 16:

As shown in FIGS. 15 and 16, the controller 180 of the mobile terminal 100 according to an embodiment of the present invention may change the form of the window EA in response to user manipulation. Referring to FIG. 15(*a*), the user may apply drag touches in first, second and third directions DR1, DR2 and DR3 to the window EA. For example, the first direction DR1 can be the horizontal direction, the second direction DR2 can be a diagonal direction and the third direction DR3 can be the vertical direction. The controller 180 can perform a specific operation corresponding to a direction in which touch drag is applied to the window EA. For example, the controller 180 can change the form of the window EA.

Referring to FIG. 15(*b*), when the drag touch in the first direction DR1 is applied, a first extended area AA1 corresponding to the drag touch in the first direction DR1 can be generated. Icons corresponding to additional applications may be arranged in the generated first extended area AA1.

Referring to FIG. 15(*c*), when the drag touch in the third direction DR3 is applied, a second extended area AA2 corresponding to the drag touch in the third direction DR3 can be generated. Additional applications may be arranged in the generated second extended area AA2. For example, contact information corresponding to specific persons can be arranged in the second extended area AA2. For example, a person that the user has recently called, a person that the user frequently contacts and/or a specific person designated by the user can be added to the second extended area AA2.

Referring to FIG. 15(*d*), when the drag touch in the second direction DR2 is applied, a third extended area AA3 corresponding to the drag touch in the second direction DR2 can be generated. Icons added to the first and second extended areas AA1 and AA2 can be arranged in the generated third extended area AA3.

Referring to FIG. 16(*a*), the user may touch the window EA downward with a finger F or the like. For example, the user can apply drag touch having a length exceeding one area in which an icon is arranged to the window EA. Referring to FIG. 16(*b*), when the user touches and drags the window EA downward, the displayed window EA may disappear. This means that the display 151 is switched from the third state into the first state.

FIGS. 17 to 21 illustrate when another region of the display 151 is activated. As shown, the controller 180 of the mobile terminal 100 according to an embodiment of the present invention may additionally display information when the user applies touch to another region of the display 151.

Figure 17:
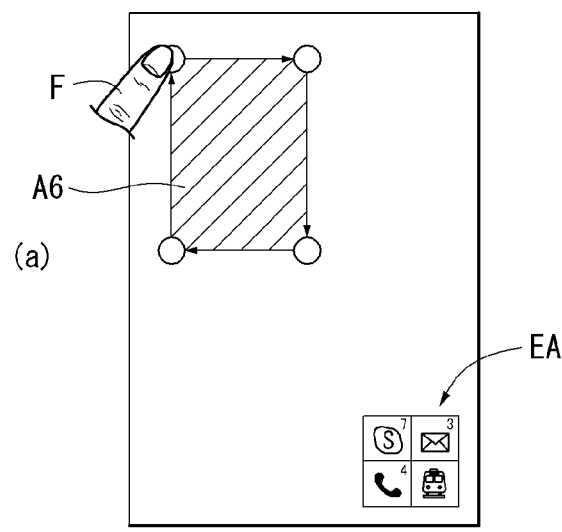
FIGS. 17 to 21 illustrate a case in which another region of the display is activated.
Figure 17:
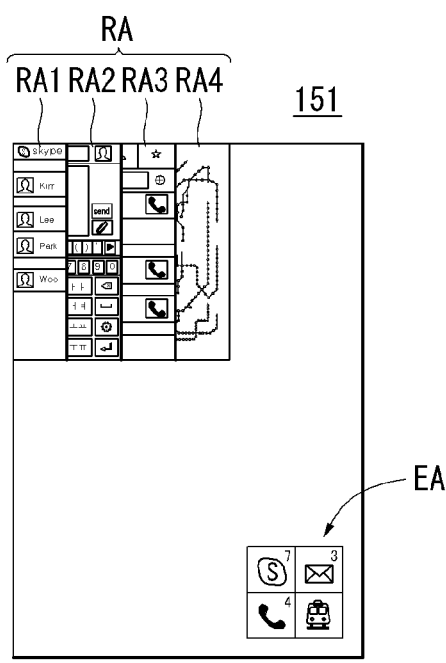

Referring to FIG. 17(*a*), the user may touch a specific region of the display 151 with a finger F. The controller 180 can calculate a sixth area A6 corresponding to the touched region. Referring to FIG. 17(*b*), the controller 180 can display an application window RA corresponding to the sixth area A6. Applications related to icons included in the window EA can be displayed in the application window RA. For example, the first to fourth application windows RA1 to RA4 can be displayed. The first to fourth application windows RA1 to RA4 can display applications respectively corresponding to icons included in the window EA.

The controller 180 can display the first to fourth application windows RA1 to RA4 in an overlapping manner. That is, the controller 180 displays the first to fourth application windows RA1 to RA4 so the first to fourth application windows RA1 to RA4 overlap in order to display a plurality of applications in a relatively narrow area. Accordingly, related applications can be displayed in a minimum area.

Figure 18:
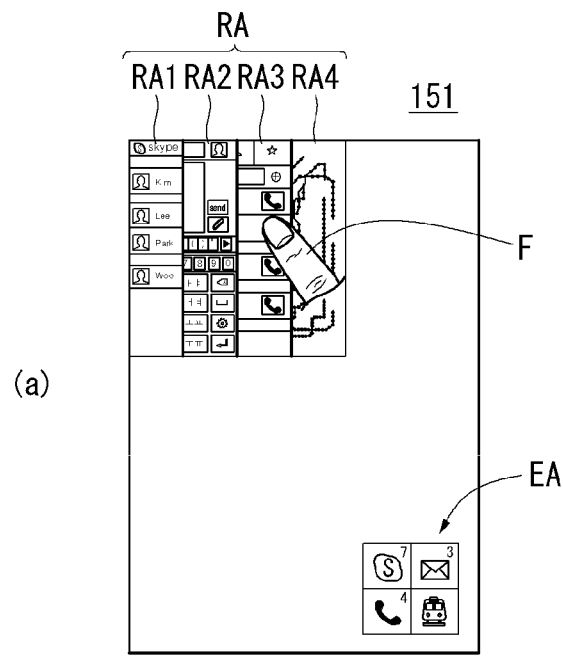
Figure 18:
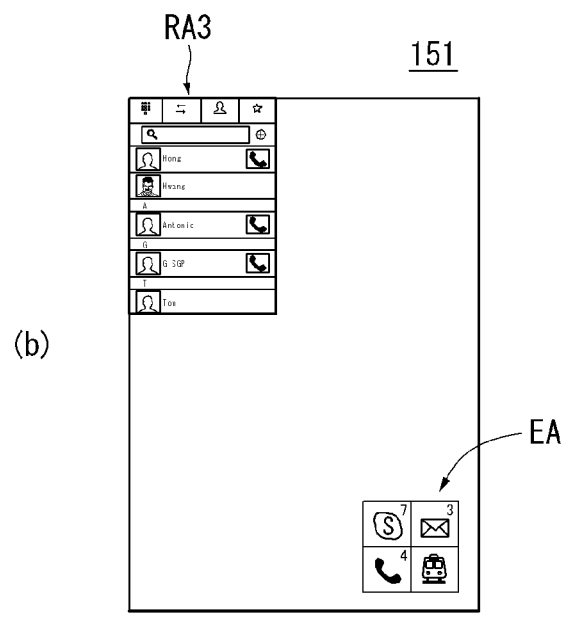

Referring to FIG. 18(*a*), the user may select a specific application with a finger F. For example, the user can select the third application window RA3. Referring to FIG. 18(*b*), the controller 180 can display the selected application window RA3 in the sixth area A6.

Figure 19:
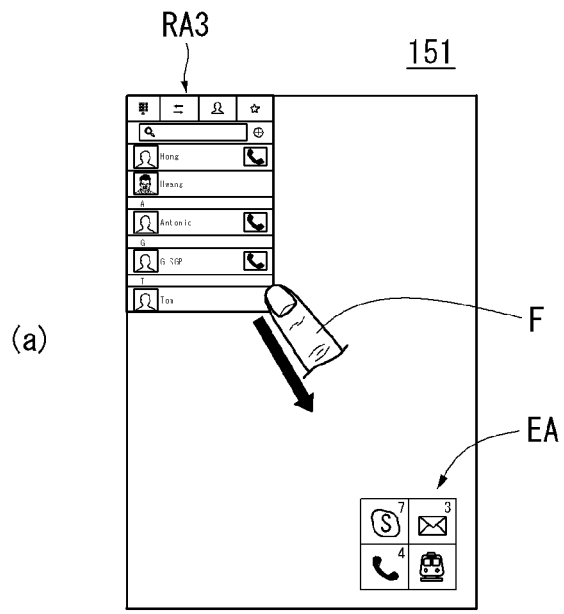
Figure 19:
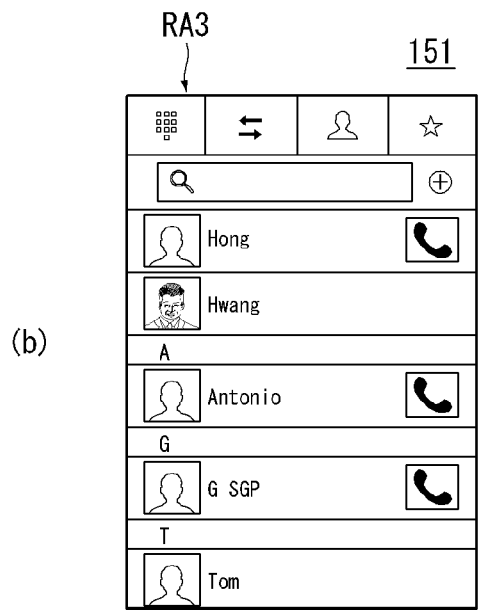

Referring to FIG. 19(*a*), the user may drag the third application window RA3 using a finger F. For example, the user can apply drag touch in a direction exceeding the displayed sixth area A6. Referring to FIG. 19(*b*), the controller 180 can expand the third application window RA3 to the whole area of the display 151 in response to the drag touch of the user. That is, the third state in which only a specific region of the display 151 is activated can be converted into the second state in which a specific application selected by the user is extended and displayed in the whole area of the display 151.

Figure 20:
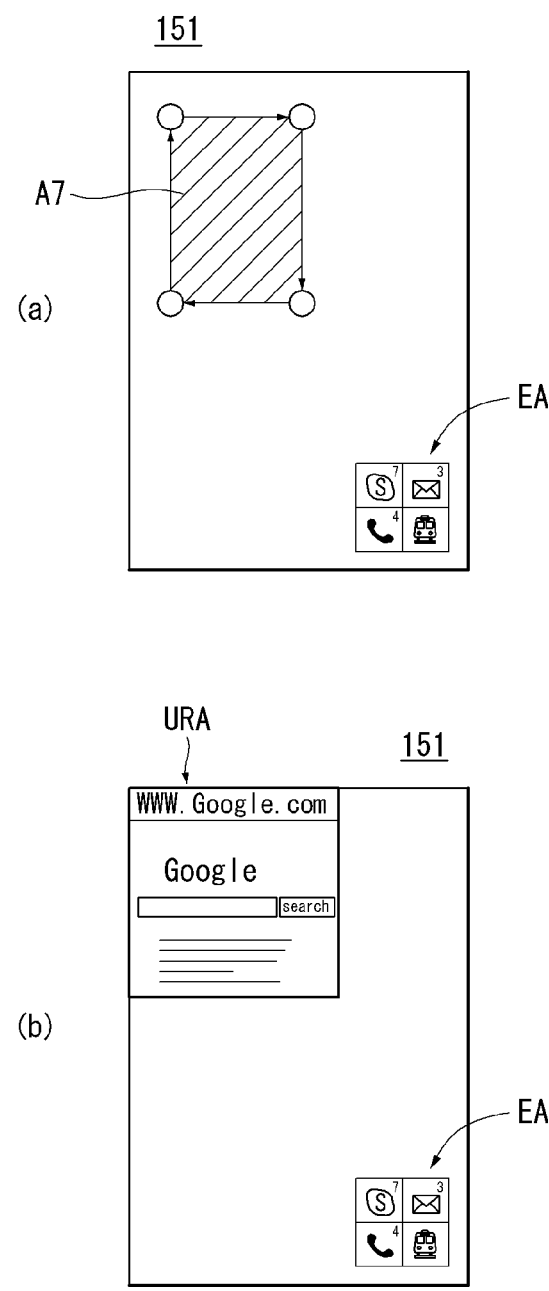

Referring to FIG. 20(*a*), a seventh area A7 may be specified according to touch operation. Referring to FIG. 20(*b*), the controller 180 can display an unrelated application URA in the seventh area A7. That is, an application that is not related to applications included in the currently displayed window EA can be displayed in the seventh area A7. The unrelated application URA may be an application that has been recently executed, an application frequently used by the user and/or an application that is expected to be used based on the corresponding position.

Figure 21:
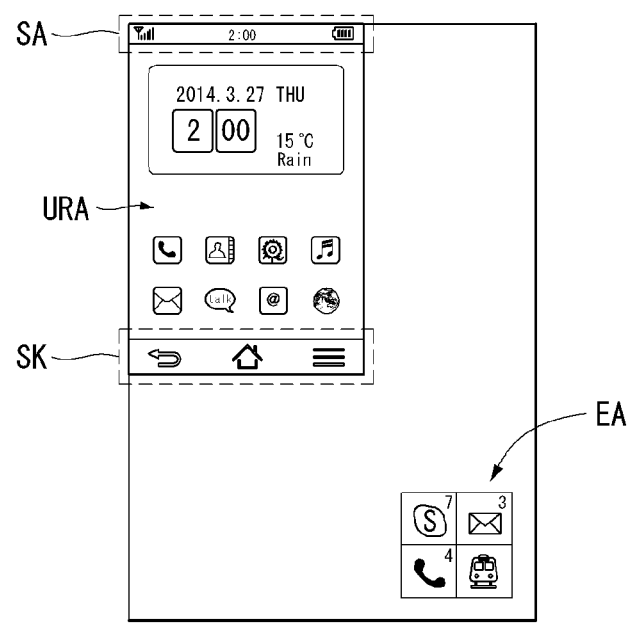

Referring to FIG. 21, the controller 180 can display an unrelated application URA in an area specified according to touch. Here, the controller 180 can display the unrelated application URA in a form that is displayed in the second state in which the entire display 151 is activated. For example, the controller 180 can display the unrelated application URA along with a status area SA and/or a soft key area SK of the mobile terminal. Accordingly, the user can operate the unrelated application URA as if the display 151 is in the second state even though the display 151 is in the third state in which the display 151 is partially activated.

Figure 22:
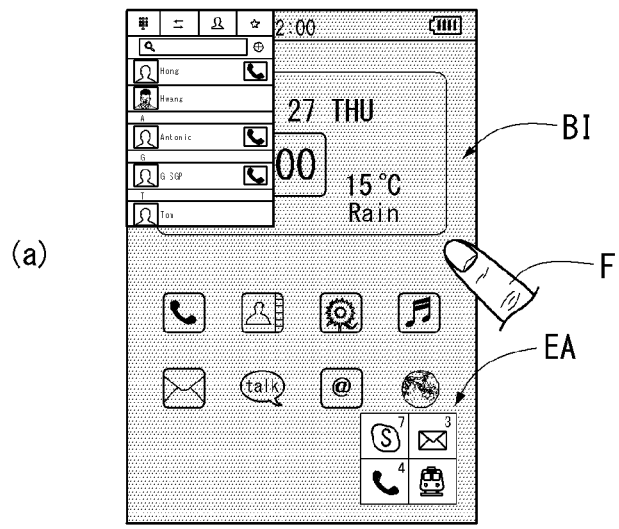
FIG. 22 illustrates an embodiment of displaying a background image while a region of the display is activated.
Figure 22:
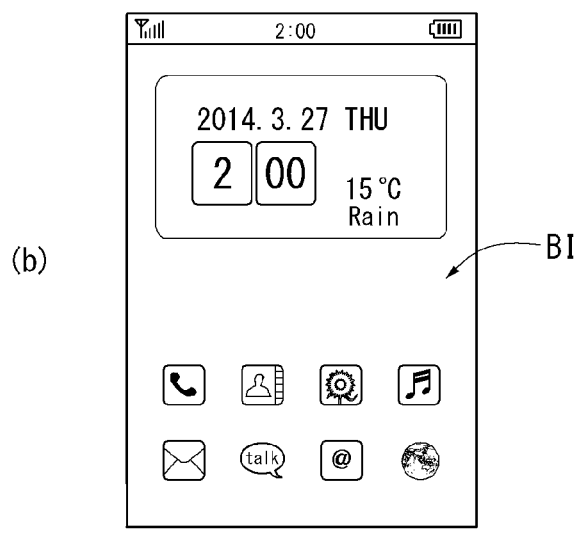
Figure 23:
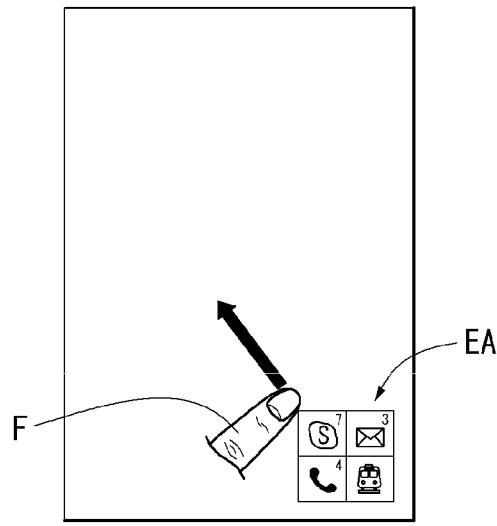
FIGS. 23 to 27 illustrate manipulation of the window displayed in the activated region.
Figure 23:
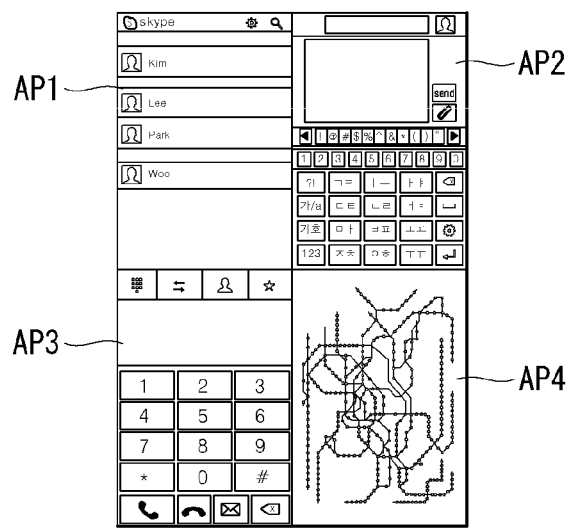
Figure 24:
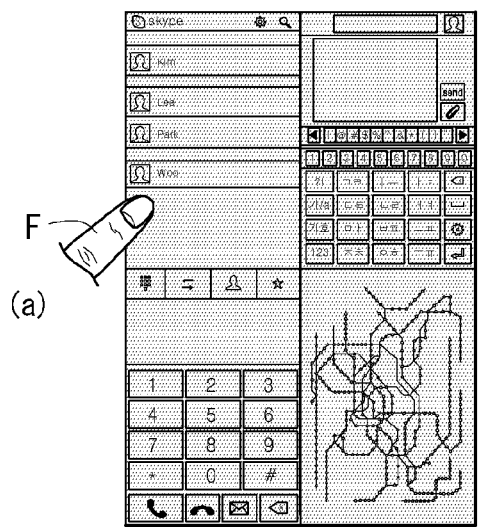
Figure 24:
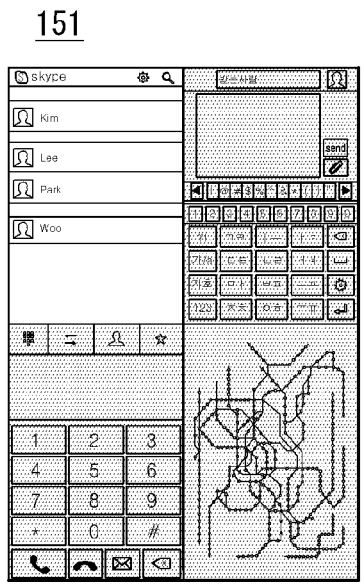
Figure 25:
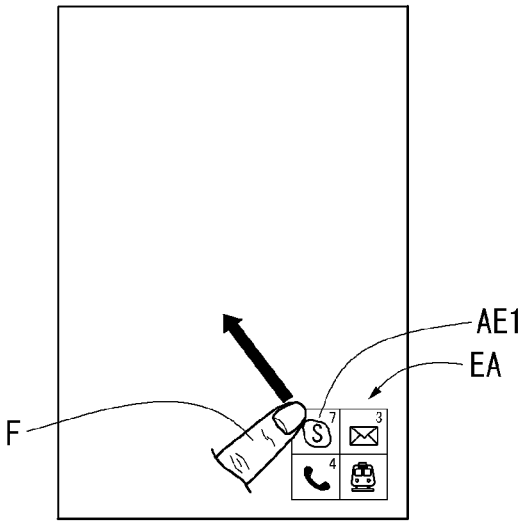
Figure 25:
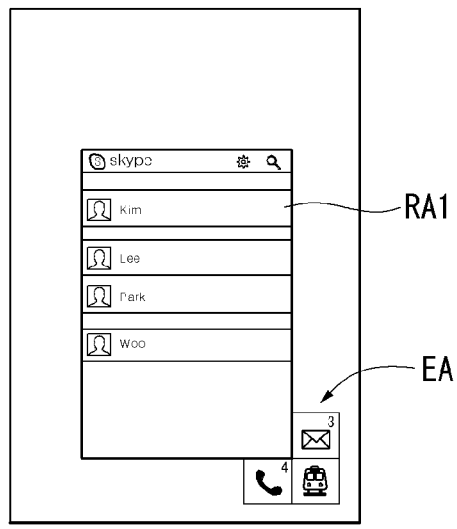
Figure 26:
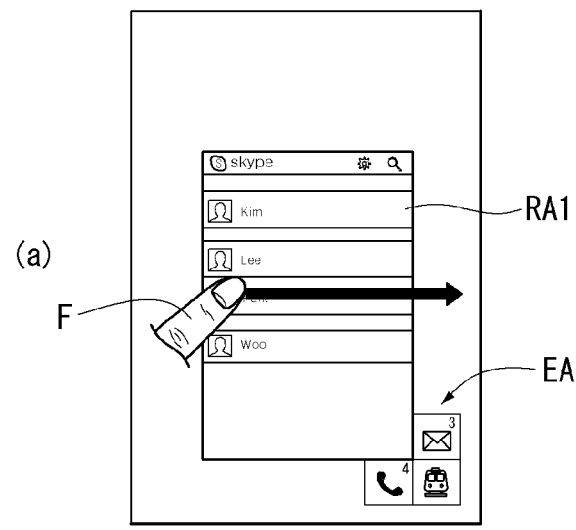
Figure 26:
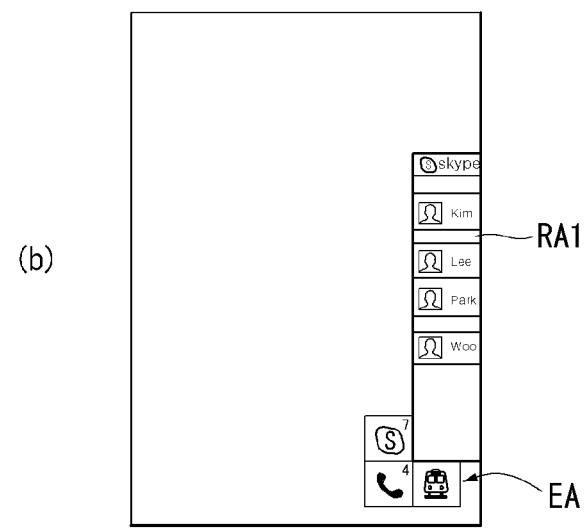
Figure 27:
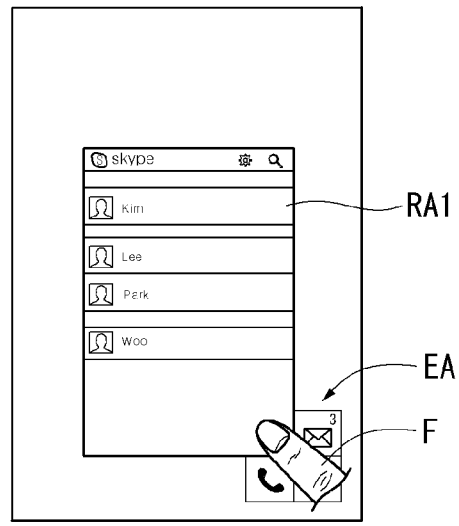
Figure 27:
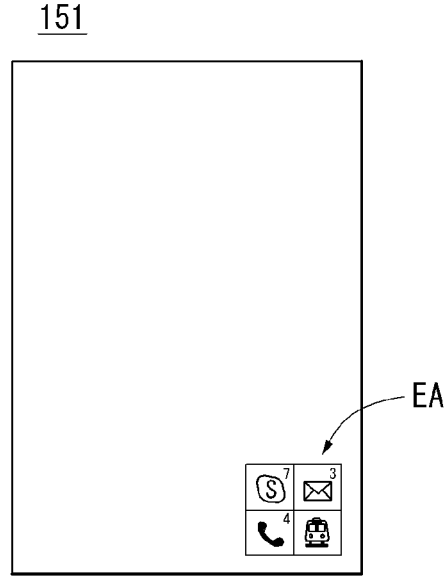

FIG. 22 illustrates an embodiment of displaying a background image while a region of the display is activated. As shown, the controller 180 of the mobile terminal according to an embodiment of the present invention may display information in a region of the display in a dimming state in which backlighting corresponding to an area other than a displayed activated area is turned off.

Referring to FIG. 22(a), only the window EA corresponding to a specific region of the display 151, selected by the user, may be activated in the third state. The controller 180 can activate the window EA and, simultaneously, dim a background image BI. For example, the controller 180 can maintain backlighting corresponding to the background image BI in an off state.

Referring to FIG. 22(b), when the user selects the background image BI, the controller 180 can switch the display 151 from the third state to the second state. When the display 151 is switched to the second state, the controller 180 can cancel display of information, which has been activated and displayed in the third state, such as the window EA.

FIGS. 23 to 27 illustrate manipulation of the window displayed in an activated region of the display 151. As shown, the controller 180 of the mobile terminal 100 according to an embodiment of the present invention can display applications included in the window EA on the display 151 in response to operation performed on the window EA.

Referring to FIG. 23(a), the user may touch and drag the window EA with a finger F. For example, the user can apply touch-and-drag toward the outside of the window EA. Referring to FIG. 23(b), the controller can display first to fourth applications AP1 to AP4, included in the window EA, in the whole area of the display 151 in response to the touch-and-drag operation of the user. The first to fourth applications AP1 to AP4 may be displayed in areas obtained by dividing the display 151 equally and/or unequally. For example, the first to fourth applications AP1 to AP4 can be respectively displayed in areas, obtained by equally dividing the display 151 into four parts, such that the first to fourth applications AP1 to AP4 respectively correspond to the positions thereof arranged in the window EA.

The controller 180 can control the display 151 to be switched to the second state corresponding to a deactivated state when the first to fourth applications AP1 to AP4 are displayed. That is, the controller 180 can control the display 151 to be switched to the dimming state in which the backlight is turned off although the first to fourth applications AP1 to AP4 are displayed on the display 151.

Referring to FIG. 24(a), the user may select a specific application using a finger F. Referring to FIG. 24(b), the controller 180 can selectively activate only a region corresponding to the specific application selected by the user. For example, the controller 180 can turn on only backlighting of a region corresponding to the first application AP1.

Referring to FIG. 25(a), the user may touch and drag a specific region using a finger F. For example, the user can touch and drag the first area AE1 to the outside of the first area AE1. Referring to FIG. 25(b), the controller 180 can display the first application RA1 corresponding to the first area AE1 in response to the touch-and-drag operation of the user. For example, the controller 180 can selectively activate the window EA and the region corresponding to the first application RA1.

Referring to FIG. 26(a), the user may touch and drag the displayed first application RA1. For example, the user can touch and drag the first application RA1 to the right. Referring to FIG. 26(b), the controller 180 can produce animation effect that the first application RA1 gradually disappears to the outside of the display 151 in response to the touch-and-drag operation of the user.

Referring to FIG. 27(a), the user may touch the first area AE1 of the window EA. The controller 180 can display the first application RA1 corresponding to the touched first area AE1. Referring to FIG. 27(b), the controller 180 can cancel display of the first application RA1 when user releases the touch applied to the first AE1. That is, the first application RA1 is displayed only when user touch is maintained.

Figure 28:
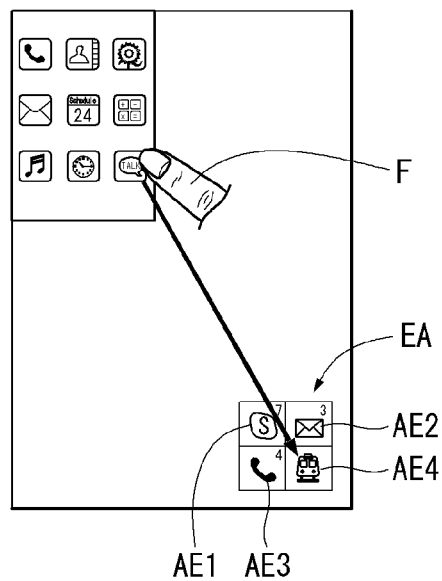
FIG. 28 illustrates manipulation of icons included in the displayed window.
Figure 28:
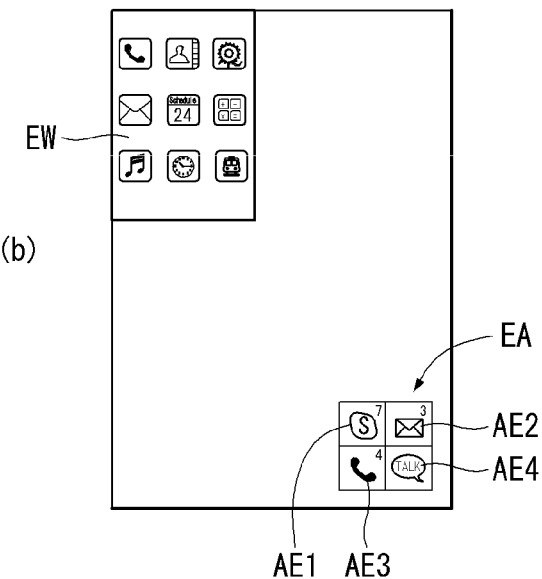

FIG. 28 illustrates manipulation of icons included in the displayed window. As shown, the controller 180 of the mobile terminal 100 according to an embodiment of the present invention may change applications to be included in the window EA.

Referring to FIG. 28(a), the display 151 may display an application window EW. The application window EW may display candidate applications that can be included in the window EA. The user may touch and drag at least one of icons included in the application window EW to the window EA using a finger F. For example, the user can touch and drag the icon to the fourth area AE4. Referring to FIG. 28(b), the controller 180 can change an icon displayed in the fourth area AE4. For example, the controller 180 can replace the icon of the fourth area AE4 by the new icon. That is, a specific application can be included in or removed from the window EA by the user.

Figure 29:
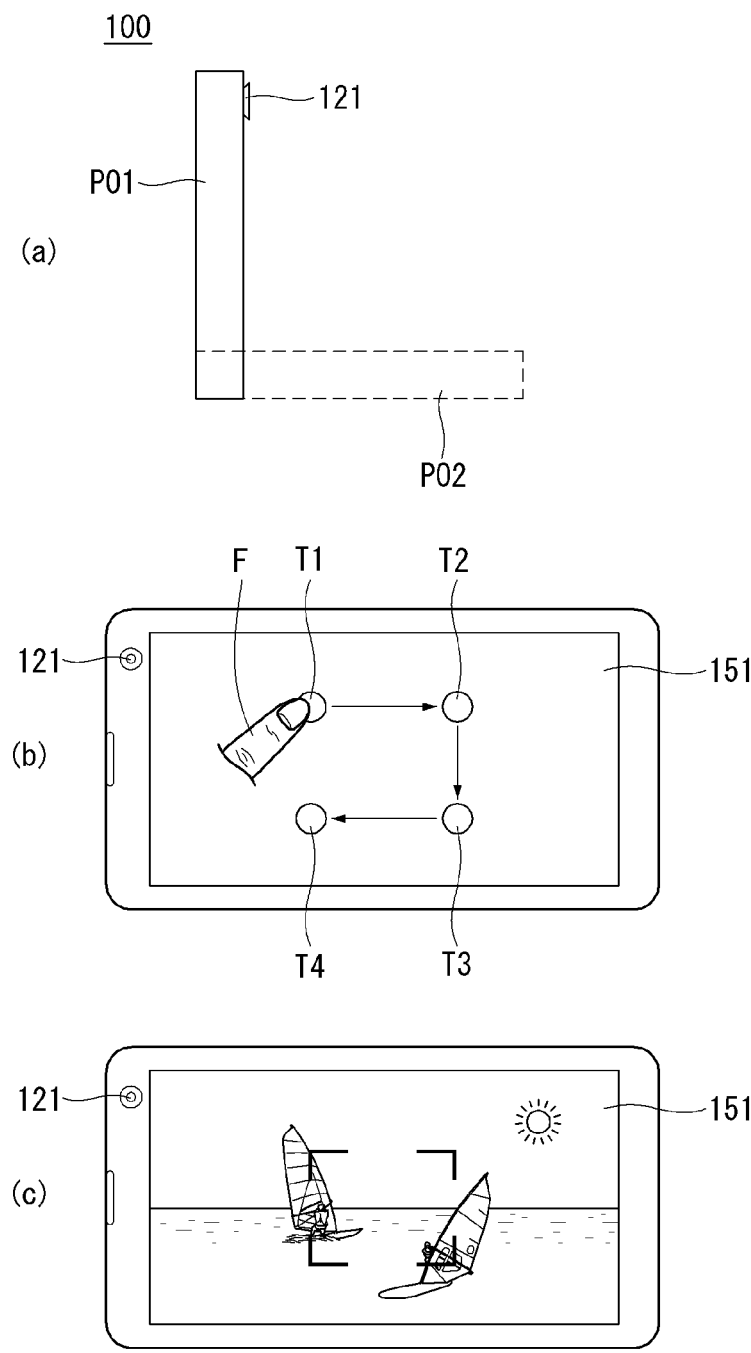
FIG. 29 illustrates operation of the mobile terminal according to mobile terminal state.

FIG. 29 illustrates operation of the mobile terminal according to state of the mobile terminal. As shown, the controller 180 of the mobile terminal 100 according to an embodiment of the present invention may selectively activate the display 151 according to the posture and/or position of the mobile terminal 100.

Referring to FIG. 29(a), the mobile terminal 100 may be at a first position PO1 or second position PO2. The first position PO1 may correspond to a state in which the camera 121 of the mobile terminal 100 faces forward and the second position PO2 may correspond to a state in which the camera 121 of the mobile terminal 100 faces downward. At the first position PO1, the user may intend to take a picture using the camera 121.

Referring to FIG. 29(b), the user may apply a serious of touches to the display 151 using a finger F at the first position PO1. For example, the user can perform touch operation corresponding to a predetermined touch pattern in the first state in which the entire display 151 is deactivated.

Referring to FIG. 29(c), upon application of the touches when the mobile terminal 100 is at the first position PO1, the controller 180 can activate the display 151 and the camera 121 to perform photographing. Accordingly, the user can take a picture rapidly and conveniently without activating the display 151 and operating the camera 121.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a wireless communication unit configured to provide wireless communication;
   a display; and
   a controller configured to:
   control the display to be in at least one of a first state in which the entire display is deactivated, a second state in which the entire display is activated and a third state in which a partial region of the display is activated,
   receive a plurality of touches applied to the display in the partial region,
   display a window including at least one of an icon indicating a newly generated event, an icon frequently used by a user and an icon corresponding to a predetermined function, in the activated partial region, and
   activate the partial region corresponding to a plurality of touches applied to a different area of the display and display, in the activated partial region, at least one application corresponding to at least one icon included in the window.

2. The mobile terminal of claim 1, wherein the controller is further configured to switch the display from the first state to the third state when the plurality of touches corresponds to a predetermined specific touch pattern.

3. The mobile terminal of claim 1, wherein the controller is further configured to determine the activated partial region based on at least one of the position and size of the partial region corresponding to the plurality of touches.

4. The mobile terminal of claim 1, wherein the controller is further configured to divide the window into a plurality of areas and arrange the at least one icon in the areas.

5. The mobile terminal of claim 1, wherein the controller is further configured to divide the window into a plurality of areas, and
   wherein the plurality of areas includes an area for displaying an event received from the outside and an area for displaying an icon corresponding to an application which is set irrespective of the event.

6. The mobile terminal of claim 1, wherein the controller is further configured to arrange an icon for executing a predetermined specific application at a position corresponding to the last touch from among the plurality of touches.

7. The mobile terminal of claim 6, wherein the specific application is an application for executing a call function.

8. The mobile terminal of claim 1, wherein the controller is further configured to determine the position of the at least one icon according to order of the plurality of touches.

9. The mobile terminal of claim 1, wherein the controller is further configured to activate the partial region by turning on backlight corresponding to the region.

10. A method of controlling a mobile terminal, the method comprising:
    controlling, via a controller, a display of the mobile terminal to be in at least one of a first state in which the entire display is deactivated, a second state in which the entire display is activated and a third state in which a partial region of the display is activated;
    receiving a plurality of touches applied to the display in the partial region;
    displaying, via the display, a window including at least one of an icon indicating a newly generated event, an icon frequently used by a user and an icon corresponding to a predetermined function, in the activated partial region; and
    activating, via the controller, the partial region corresponding to a plurality of touches applied to a different area of the display and displaying, in the activated partial region, at least one application corresponding to at least one icon included in the window.

11. The method of claim 10, further comprising:
    switching the display from the first state to the third state when the plurality of touches corresponds to a predetermined specific touch pattern.

12. The method of claim 10, further comprising:
    determining, via the controller, the activated partial region based on at least one of the position and size of the partial region corresponding to the plurality of touches.

13. The method of claim 10, further comprising:
    dividing, via the controller, the window into a plurality of areas and arrange the at least one icon in the areas.

14. The method of claim 10, further comprising:
    dividing, via the controller, the window into a plurality of areas,
    wherein the plurality of areas includes an area for displaying an event received from the outside and an area for displaying an icon corresponding to an application which is set irrespective of the event.

15. The method of claim 10, further comprising:
    arranging an icon for executing a predetermined specific application at a position corresponding to the last touch from among the plurality of touches.

16. The method of claim 15, wherein the specific application is an application for executing a call function.

17. The method of claim 10, further comprising:
determining, via the controller, the position of the at least one icon according to order of the plurality of touches.

18. The method of claim 10, further comprising:
activating, via the controller, the partial region by turning on backlight corresponding to the region.

\* \* \* \* \*